United States Patent
Midgett, II et al.

[19]
[11] Patent Number: 5,968,234
[45] Date of Patent: Oct. 19, 1999

[54] TEMPERATURE SWING ADSORPTION WITH REGENERATION BY ELEVATED PRESSURE ASU NITROGEN-ENRICHED GAS

[75] Inventors: Dan Earl Midgett, II, Alburtis; David Miller Espie, Lansdale, both of Pa.

[73] Assignee: Air Products and Chemicals, Inc., Allentown, Pa.

[21] Appl. No.: 09/059,696

[22] Filed: Apr. 14, 1998

[51] Int. Cl.[6] .......................... B01D 53/04; B01D 53/26
[52] U.S. Cl. .................... 95/120; 95/123; 95/139
[58] Field of Search ................ 62/641, 644, 651; 95/99, 106, 114, 115, 120, 122, 123, 139

[56] References Cited

U.S. PATENT DOCUMENTS

| | | | |
|---|---|---|---|
| 2,944,627 | 7/1960 | Skarstrom | 183/4.7 |
| 3,363,426 | 1/1968 | Stoklosinski | 62/651 |
| 4,249,915 | 2/1981 | Sircar et al. | 55/26 |
| 4,425,142 | 1/1984 | Mann | 95/106 |
| 4,472,178 | 9/1984 | Kumar et al. | 55/25 |
| 4,541,851 | 9/1985 | Bosquain et al. | 55/208 |
| 4,557,735 | 12/1985 | Pike | 62/641 X |
| 4,698,073 | 10/1987 | Rohde et al. | 62/641 X |
| 5,137,548 | 8/1992 | Grenier et al. | 55/23 |
| 5,202,096 | 4/1993 | Jain | 95/123 X |
| 5,463,869 | 11/1995 | Kumar et al. | 62/651 |
| 5,555,749 | 9/1996 | Wehrman et al. | 62/641 |
| 5,560,763 | 10/1996 | Kumar | 95/106 X |
| 5,651,271 | 7/1997 | Fraysse et al. | 62/651 X |
| 5,661,987 | 9/1997 | Zarate | 95/115 X |
| 5,689,974 | 11/1997 | Fujita et al. | 62/644 |
| 5,794,458 | 8/1998 | Naumovitz et al. | 62/651 X |
| 5,802,872 | 9/1998 | Billingham et al. | 62/641 |
| 5,855,650 | 1/1999 | Kalbassi et al. | 95/106 |

FOREIGN PATENT DOCUMENTS

| | | | |
|---|---|---|---|
| 1-174879 | 7/1989 | Japan | 62/641 |
| 1770690 | 10/1992 | U.S.S.R. | 62/641 |
| 2083193 | 3/1982 | United Kingdom | 62/641 |

OTHER PUBLICATIONS von Gemmingen, U., "Designs of Adsorptive Dryers in Air Separation Plants", *Reports on Technology*, 54/1994, (Linde).

Acharya, D. R. et al, "Recent Advances in Molecular Sieve Unit Design for Air Separation Plants", *Separation Science and Technology*, 30(18), pp. 3489–3507, 1995.

Wolf, F. et al., "Thermal Stability of Type A Molecular Sieves in the Presence of Water Vapor", *Chem. Tech.*, Leipzig, 19:83, 1967 (In German with English translation).

*Primary Examiner*—Robert Spitzer
*Attorney, Agent, or Firm*—Willard Jones, II

[57] ABSTRACT

The present invention relates to a thermally regenerable adsorptive process for the purification of a feed air, wherein the feed air is contacted with a solid adsorbent to remove at least water and carbon dioxide, wherein, periodically, the solid adsorbent is thermally regenerated by contacting the solid adsorbent with a regeneration gas stream which is essentially free of at least water and carbon dioxide, wherein the regeneration gas is a nitrogen-enriched stream removed from an elevated pressure air separation unit fed with the purified feed air, characterized in that the removed nitrogen-enriched stream is compressed in a multiple staged compressor and that the regeneration gas is a portion of the nitrogen-enriched stream which is removed from an interstage of the multiple stage compressor and then contacted with the solid adsorbent. The process is particularly suited for use with a solid adsorbent selected from the group consisting of 13X zeolite, silica gel, A zeolite, Y zeolite, mordenite, chabazite and mixtures thereof. Finally, the process of the present invention can comprise recycling the regeneration gas after contact with the solid adsorbent to one of the stages of the multiple stage compressor, preferably, from the stage from which it was removed.

4 Claims, 1 Drawing Sheet

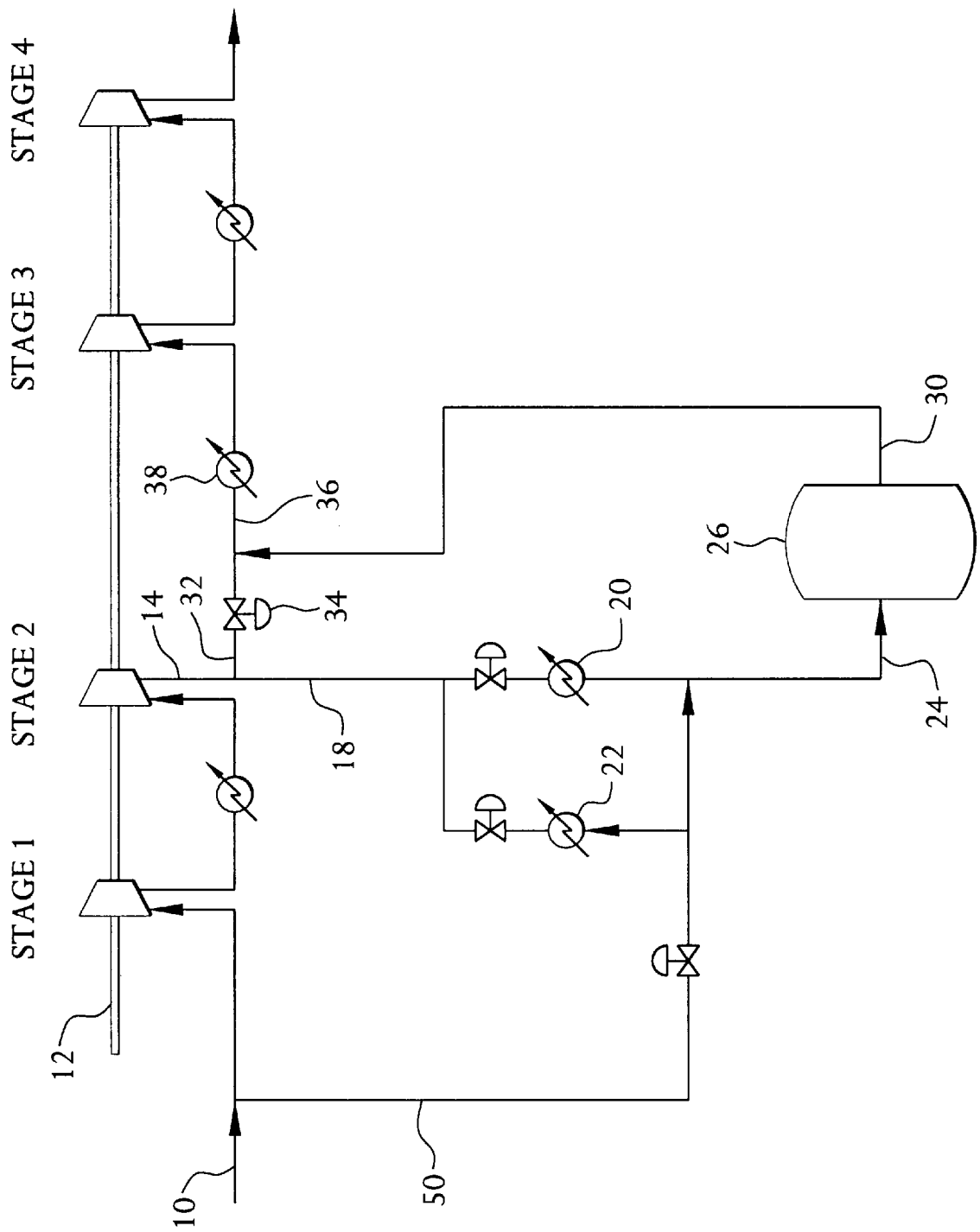

TEMPERATURE SWING ADSORPTION WITH REGENERATION BY ELEVATED PRESSURE ASU NITROGEN-ENRICHED GAS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In a process to effect the cryogenic separation of air into at least a nitrogen-enriched product and an oxygen-rich product, it is necessary to essentially remove the carbon dioxide and other impurities (e.g., water and hydrocarbons) present in the feed air so as to prevent these impurities from freezing-out on the process equipment at cryogenic temperatures. When freeze-outs occur in a cryogenic process, it causes a loss of performance and, potentially, an unsafe operating mode. Generally, two methods are used for such impurity removal. These are temperature swing adsorption (TSA) and pressure swing adsorption (PSA).

In each of these techniques, a bed of adsorbent is exposed to a flow of feed air so that the adsorbent can adsorb the bulk of the carbon dioxide and water vapor present in the feed air. This exposure is continued for a fixed period of time which is sufficiently short in duration so as to prevent the breakthrough of carbon dioxide and water in the exiting treated feed air. Thereafter, the flow of feed air is shut off from the adsorbent bed and the adsorbent is exposed to a flow of regeneration gas which strips the adsorbed carbon dioxide and water from the adsorbent and, thus, regenerates it for further use. In a temperature swing adsorber, the carbon dioxide and water are driven off from the adsorbent by heating the adsorbent in the regeneration phase. In a pressure swing adsorber, the pressure of the regeneration gas is lower than that of the feed gas and the change in pressure is used to remove the carbon dioxide and water from the adsorbent. Although discussed with reference to carbon dioxide and water removal, other impurities can also be removed from the feed air by these processes, including hydrocarbons.

The adsorbent material for these TSA and PSA adsorption processes may be molecular sieves, alumina, silica gel, plus other mixed oxides, either alone or in combination with each other.

A suitable regeneration gas for these TSA and PSA adsorption processes must have the certain properties, essentially impurity-free (carbon dioxide, water, hydrocarbons); capable of being contaminated with the desorbed impurities, and capable of being operated safely and not requiring an unconventional or exotic metallurgy for the process equipment. The gas that best meets this criteria is a nitrogen-enriched stream removed from the air separation unit.

In general, regeneration of adsorption beds includes a depressurization step. The depressurization step reduces the overall bed pressure and allows strongly adsorbed components to desorb. The desorption of strongly adsorbed components is enhanced by conditions which lower the extent of adsorption, namely decrease in partial pressure and increase in temperature. The pressure reduction step helps reduce the partial pressure of the adsorbed component and thereby enhance desorption. It is also well known in the adsorption literature, that the effectiveness of purge gas is defined by actual volume of purge not moles of purge gas (Skarstrom, U.S. Pat. No. 2,944,627). This relation suggests that for a given number of moles of gas, regeneration at the lowest pressure (highest actual volume) is most effective.

However, it is occasionally desired to regenerate adsorption beds at an elevated pressure (i.e., in excess of three (3) bar(a)). For example, there is an existing commercial installation with temperature swing adsorption which uses the nitrogen-enriched gas from the air separation unit which has been compressed to a pressure of fifteen (15) bar(a). This is particularly desired when the regeneration gas effluent is used as a feed to a gas turbine. In these power generation applications, several industry-wide problems have been identified with the use of a low pressure (i.e., less than or equal to three (3) bar (a)) regeneration gas. These are: (a) the need to maintain a constant pressure drop for the regeneration gas across the bed which results in an expensive trade-off between high velocities and large diameter vessels; (b) the extra power needed to compress the desorbed water and carbon dioxide; (c) the less favorable impact of pressure drop (assumed constant) on power because of the higher pressure ratio (power=k ln(p2/p1)); and (d) the extra capital cost required to recover heat of compression in order to replace or augment the need for heat addition.

On the other hand, several industry-wide problems have, however, also been identified with the use of elevated pressure regeneration. These are: (a) because the total bed pressure is high, the partial pressure of the adsorbed impurity remains high during the desorption process, thus, rendering desorption less favorable and requiring the use of either higher regeneration temperatures or flowrates and (b) the generation of steam during the regeneration process is possible when water-laden adsorbents are regenerated at high pressure.

Because the regeneration pressure is elevated (with a consequent low actual volume of regeneration gas), the contact time of the regeneration gas in the bed can be quite high. The in-situ generated steam can then react with standard desiccants like alumina, silica gel and zeolites. This steam reacts with the desiccants and causes "aging" of the materials. In the case of alumina, this aging, or loss of dehydration performance, is caused by reaction of steam with the alumina oxide to form aluminum hydroxide. The resultant alumina hydroxide has a lower surface area and lower water capacity than "fresh" alumina. The same type of reactions occur with silica gel. In the case of zeolites, steam can react with the zeolite structure, resulting in the loss of framework aluminum which then causes loss of crystallinity and adsorption capacity of the zeolite.

Even in conventional low pressure regeneration temperature swing adsorbers, there is a gradual decrease in the capacity of the adsorbents. Although the rate of degradation is affected by many factors including regeneration temperature, the concentration of corrosive gases such as $SO_2$, $NO_2$, $Cl_2$ or $NH_3$ in the feed air, the air separation industry experience is that adsorbents are rarely replaced in less than five (5) years, and may perform satisfactorily in service for more than ten (10) years.

Temperature swing adsorption is an energy intensive process because of the need to supply heat to the regenerating gas. The temperatures needed for the regeneration gas are typically high, i.e., 150° C. to 200° C., which places demands on the system engineering which, in turn, increase costs. Most literature concerning temperature swing adsorption is aimed at reducing the heat input to the adsorber system. There are numerous references which teach methods for improving the operation of adsorption beds by such things as improved bed designs (e.g., U.S. Pat. Nos. 4,249,915 and 4,472,178), adsorbent material, combination and placement of adsorbent material, cycle times (heating, cooling, and purge) (e.g., von Gemmingen, U., "Designs of Adsorptive Dryers in Air Separation Plants", Reports on Technology, 54/1994, (Linde)), and regeneration heat-up temperature, regeneration cool-down temperature, temperature pulsing (e.g., U.S. Pat. No. 5,137,548 and U.S. Pat. No. 4,541,851).

All these references refer to regeneration with a near atmospheric gas (i.e., low pressure regeneration), either explicitly or implicitly through a description of the steps in the cycle and the order in which they occur: (a) adsorption, (b) depressurization, (c) regeneration and (d) repressurization. No information has been uncovered which teaches or suggests the use of a compressed air separation unit product as regeneration gas for the adsorbent.

Acharya and Jain (1995) in "Recent Advances in Molecular Sieve Unit Design for Air Separation Plants", Separation Science and Technology, 30(18), pp 3489–3507 describe the advantages of mixed alumina/13X beds. They teach that the use of alumina for water adsorption is preferable for many reasons, one of which is that alumina is "a more resilient material than molecular sieve".

With respect to zeolites, the prior art which suggests that reaction of zeolites, particularly low Si/Al ratio zeolites, with water causes crystal structure damage. For example, it has been shown that exposure of zeolite NaX (13X) to steam at 350° C. results in loss of crystal structure and adsorption capacity (i.e., F. Wolf, H. Fuertig, G. Nemitz, Chem. Tech., Leipzig, 19:83, 1967). In contrast, zeolite Y, which has the same crystal structure as X, but a higher Si/Al ratio, retains its structure when exposed to water vapor at 410°C.

Other references include U.S. Pat. No. 4,541,851 that teaches a temperature swing adsorption process in which the heat pulse is consumed in desorbing both the more strongly and weakly adsorbed components from the adsorbent. U.S. Pat. Nos. 4,249,915 and 4,472,178 teach an adsorption process in which water and carbon dioxide are removed from atmospheric air by adsorption in separate beds with the water laden bed being regenerated by pressure swing adsorption in a relatively short operating cycle while the carbon dioxide laden bed is regenerated thermally at considerably longer time intervals.

BRIEF SUMMARY OF THE INVENTION

The present invention relates to a thermally regenerable adsorptive process for the purification of a feed air, wherein the feed air is contacted with a solid adsorbent to remove at least water and carbon dioxide, wherein, periodically, the solid adsorbent is thermally regenerated by contacting the solid adsorbent with a regeneration gas stream which is essentially free of at least water and carbon dioxide, wherein the regeneration gas is a nitrogen-enriched stream removed from an elevated pressure air separation unit fed with the purified feed air, characterized in that the removed nitrogen-enriched stream is compressed in a multiple staged compressor and that the regeneration gas is a portion of the nitrogen-enriched stream which is removed from an interstage of the multiple stage compressor and then contacted with the solid adsorbent. The process is particularly suited for use with a solid adsorbent selected from the group consisting of 13X zeolite, silica gel, A zeolite, Y zeolite, mordenite, chabazite and mixtures thereof. Finally, the process of the present invention can comprise recycling the regeneration gas after contact with the solid adsorbent to one of the stages of the multiple stage compressor, preferably, from the stage from which it was removed.

BRIEF DESCRIPTION OF SEVERAL VIEWS OF THE DRAWINGS

The single figure of the drawing is a schematic diagram of the regeneration step of the adsorption process of the present invention.

DETAILED DESCRIPTION OF THE INVENTION

Many of the problems associated with obtaining a regeneration gas before or after compression as discussed above can be mitigated by drawing the regeneration gas from a compressor interstage. By pulling the regeneration gas off a compressor interstage, advantage can be taken of the heat of compression which can replace or supplement costly external heating. The reduced adsorbent life observed at higher pressures will be mitigated or eliminated. The thick vessel walls necessary for higher pressures and higher temperatures will be reduced and, thus, the vessel cost will be substantially reduced. The extra power required to compress desorbed carbon dioxide and water will be less than with compressor suction pressure regeneration but more than with compressor discharge pressure regeneration. If the vessel diameter is determined by the regeneration gas rate rather than the air rate, the vessel diameter can be less than with compressor suction pressure regeneration but greater than with compressor discharge regeneration. If the vessel diameter is determined by the air rate, regeneration gas velocities and pressure drops will be less than with compressor suction regeneration and lower velocities which might be experienced with compressor discharge regeneration could cause a deleterious effect on the life of the adsorbent. Desorption of the impurities will be more favorable at interstage regeneration than at discharge regeneration but less favorable than at suction regeneration at the same regeneration temperature. Assuming a constant regeneration gas pressure drop across the bed, an unfavorable impact on power would occur at lower regeneration pressure because of the higher pressure ratio (Power=k In $P_2/P_1$).

The single figure of the drawing depicts the process of the present invention. With reference to this single figure, nitrogen-enriched stream 10 from an air separation unit is compressed in four (4) stage compressor 12 with interstage cooling. A portion (stream 18) of the discharge from stage two (stream (14) is heated in heater 20 and cooled in cooler 22. Depending on the phase of the cycle the heated or cooled gas 24 enters the adsorption bed 26.

The regeneration gas 30 containing the desorbed impurities is combined with the remaining portion (stream 32) of the stage two discharge after it has been reduced in pressure across valve 34. The combined stream 36 is cooled in cooler 38 before entering the suction of stage three.

Stream 10 can serve a dual purpose. This uncompressed stream can also be used as the purge gas (stream), via line 50, for the purge step in the adsorption cycle. The purge step follows the adsorption step in the cycle. The purpose of the purge step is to remove the residual oxygen in adsorber bed 26. Since the purge stream exiting adsorber bed 26 would have an oxygen content which exceeds the allowable limit in the nitrogen-enriched stream to a gas turbine, it would need to be vented. Further, stream 10 can also be used to regenerate the adsorber bed 26, via line 50, anytime the air separation unit is operating but compressor 12 is not. In this case, the discharge from adsorber bed 26 must be vented.

There are other possible variations that still reside within the spirit of the invention. For example, the regeneration gas may be extracted from stage 3 instead of stage 2. There may be multiple adsorber beds. Further, the regeneration gas 30 containing the desorbed impurities can be fed to an earlier stage of the multiple stage compressor.

The present invention is particularly suited for use with an adsorbent which is selected from the group consisting of 13X zeolite, silica gel, A zeolite, Y zeolite, mordenite, chabazite and mixtures thereof.

The process of the present invention has been discussed with respect to a specific embodiment thereof. This embodiment should not be viewed as a limitation on the scope of the present invention. The scope of the present invention should be ascertained by the following claims.

We claim:

1. A thermally regenerable adsorptive process for the purification of a feed air, wherein the feed air is contacted with a solid adsorbent to remove at least water and carbon dioxide, wherein, periodically, the solid adsorbent is thermally regenerated by contacting the solid adsorbent with a regeneration gas stream which is essentially free of at least water and carbon dioxide, wherein the regeneration gas is a nitrogen-enriched stream removed from an elevated pressure air separation unit fed with the purified feed air, characterized in that the removed nitrogen-enriched stream is compressed in a multiple staged compressor and that the regeneration gas is a portion of the nitrogen-enriched stream which is removed from an interstage of the multiple stage compressor and then contacted with the solid adsorbent.

2. The process of claim 1 wherein the solid adsorbent is selected from the group consisting of 13X zeolite, silica gel, A zeolite, Y zeolite, mordenite, chabazite and mixtures thereof.

3. The process of claim 1 which further comprises recycling the regeneration gas after contact with the solid adsorbent to one of the stages of the multiple stage compressor.

4. The process of claim 3 wherein said stage is the same stage of the multiple stage compressor from which the regeneration gas was removed.

\* \* \* \* \*